United States Patent
Seki et al.

(10) Patent No.: US 8,078,917 B2
(45) Date of Patent: Dec. 13, 2011

(54) KVM SWITCH, KVM SYSTEM AND COMPUTER READABLE MEDIUM

(75) Inventors: Fujio Seki, Shinagawa-ku (JP); Naoyuki Nagao, Shinagawa-ku (JP)

(73) Assignee: Fujitsu Component Limited, Tokyo (JP)

( * ) Notice: Subject to any disclaimer, the term of this patent is extended or adjusted under 35 U.S.C. 154(b) by 637 days.

(21) Appl. No.: 12/232,606

(22) Filed: Sep. 19, 2008

(65) Prior Publication Data

US 2009/0083458 A1    Mar. 26, 2009

(30) Foreign Application Priority Data

Sep. 20, 2007    (JP) ................. 2007-244402

(51) Int. Cl.
*G06F 11/00*    (2006.01)
(52) U.S. Cl. ...................................... 714/38.1
(58) Field of Classification Search .................. 714/38.1
See application file for complete search history.

(56) References Cited

U.S. PATENT DOCUMENTS

| | | | |
|---|---|---|---|
| 6,567,869 B2 | 5/2003 | Shirley | |
| 2007/0022176 A1* | 1/2007 | Kobayashi | 709/217 |
| 2007/0079008 A1* | 4/2007 | Leibovich et al. | 709/246 |
| 2009/0013109 A1* | 1/2009 | Schweig | 710/72 |
| 2009/0177901 A1* | 7/2009 | Chen et al. | 713/310 |
| 2011/0063211 A1* | 3/2011 | Hoerl et al. | 345/157 |

FOREIGN PATENT DOCUMENTS

JP    2006-99498    4/2006

* cited by examiner

*Primary Examiner* — Bryce Bonzo
(74) *Attorney, Agent, or Firm* — Staas & Halsey LLP

(57) ABSTRACT

A KVM switch includes a storing portion that stores partial data of a freeze-up screen outputted when each server freezes up, and a controlling portion that receives digital data (that is, screen data) transmitted from each server, determines whether received screen data includes a part identical to the partial data of the freeze-up screen, and controls a power supply regulator to restart the freeze-up server when it is determined that the received screen data includes the part identical to the partial data of the freeze-up screen.

7 Claims, 8 Drawing Sheets

FIG. 5

| SERVER | IDENTIFICATION INFORMATION OF THE SERVER | CONNECTOR |
|---|---|---|
| 1-1 | a0001 | 33-1 |
| 1-2 | a0002 | 33-2 |
| ⋮ | ⋮ | ⋮ |
| 1-N | a000N | 33-N |

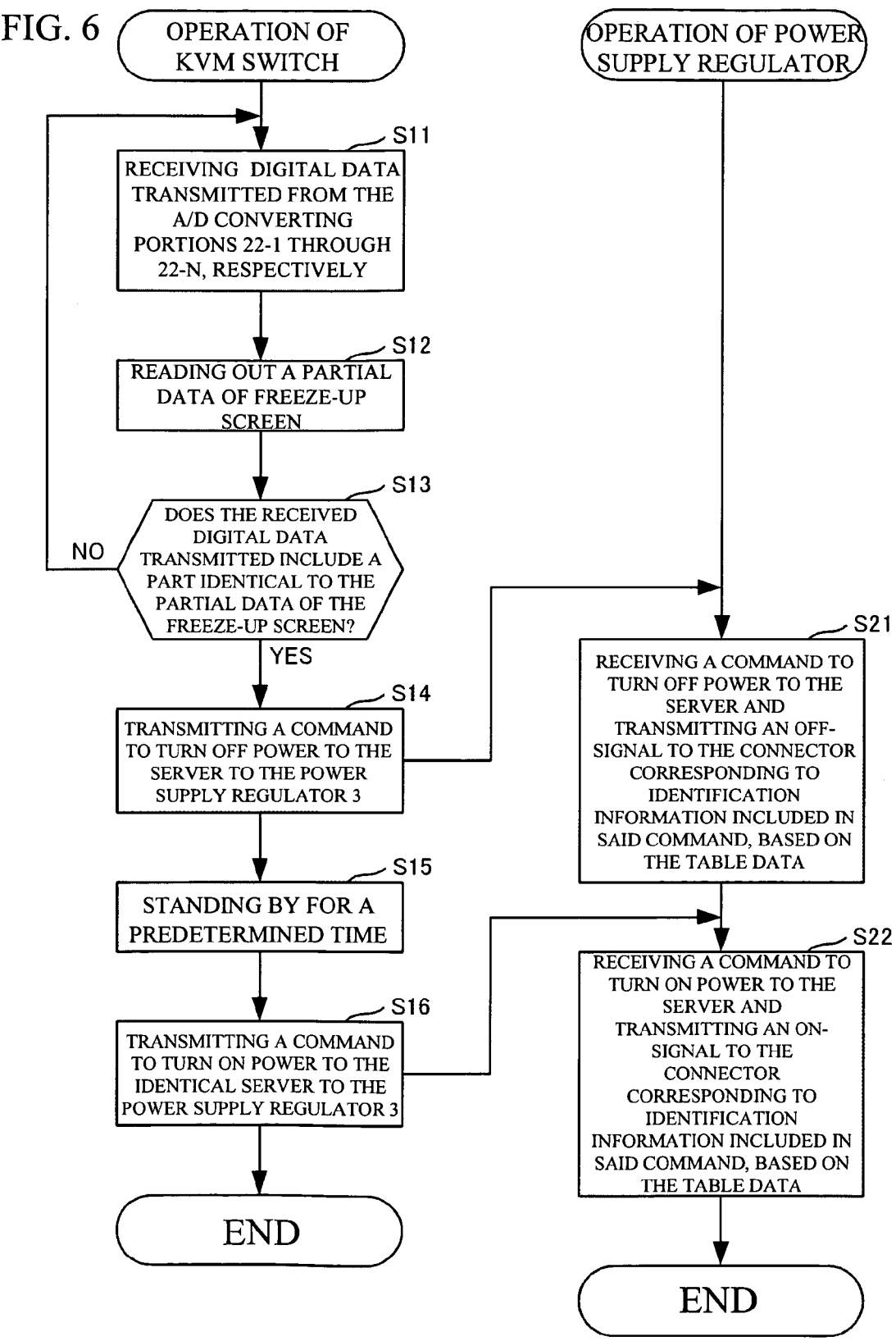

FIG. 7A

```
*** STOP: 0x0000007B (0xF141B84C,0xC0000034,0x00000000,0x00000000)
INACCESSIBLE_BOOT_DEUIICE

If this is the first time you've seen this Stop error screen,
restart your computer. If this screen appears again, follow
these steps:

Check for viruses on your computer. Remove any newly installed
hard drives or hard drive controllers. Check your hard drive
to make sure it is properly con figured and terminated.
Run CHKDSK /F to check for hard drive corruption, and then
restart your computer.

Refer to your Getting Started manual for more information on
troubleshooting Stop errors.
```

You need to restart your computer. Hold down the Power button for several seconds or press the Restart button. — 53

Veuillez redémarrer votre ordinateur. Maintenez la touche de démarrage enfoncée pendant plusieurs secondes ou bien appuyez sur le bouton de réinitialisation. — 54

Sie müssen lhren Computer neu starten, Halten Sie dazu die Einschalttaste einige Sekunden gedrückt Oder drücken Sie die Neustart-Taste. — 55

```
PIIX4:  IDE controller at PCI slot 00:07.1
PIIX4:  chipset revision 1
PIIX4   not 100% native mode: will probe irqs later
    ide1: BM-DMA at 0x18d8-0x10df<1>Unable to handle kernel NULL pointer dereference
at virtual address 0000043c
 printing eip:
c020fb86
*pde = 0000000
Oops: 0000
CPU:    0
KIP:    0010:[<c020fb86>]    Not tainted
EFLAGS : 00000202
eax: 00000000   ebx: c0385300   ecx: c11cc4cc   edx: c02fdb54
esi: c03852ec   edi: 000010d8   ebp: 00000000   esp: c11d3ec4
ds: 0018  es: 0018  ss: 0018
Process swapper (pid: 1, stackpage=c11d3000)
Stack: 000010d8 c03852ec c11cc400 c11d3f2c c020fc18 c03852ec 000018d8 0000008
       c020fc33 c03852ec 000010d8 00000000 000010d8 c03852ec c11cc400 c03412cd
       c03852ec 000010d8 00000000 c020e56b c03852ec 000010d8 c03852ec c02fdb75
Call Trace:   [<c020fc18>] [<c020fc33>] [<c020e56b>] [<c020e8b8>] [<c020e92b>]
  [<c01f65bf>] [<c0105023>] [<c010Bf98>]

Code: 8b 80 3c 04 00 00 eb 04 89 f6 89 f8 8b 96 54 04 00 00 89 86
<0>Kernel panic: Attempted to kill init!
```

57

KVM SWITCH, KVM SYSTEM AND COMPUTER READABLE MEDIUM

BACKGROUND OF THE INVENTION

1. Field of the Invention

The present invention generally relates to KVM switches, KVM systems and computer readable mediums.

2. Description of the Related Art

A KVM (K: keyboard, V: video, M: mouse) switch includes a terminal emulator connected between a plurality of servers and peripheral devices such as, mouses, keyboards and monitors, as disclosed in U.S. Pat. No. 6,567,869 (KVM SWITCH INCLUDING A TERMINAL EMULATOR), which is hereinafter referred to as Document 1. The KVM switch has a function of converting video data received from a port of a selected server into an analog video data, which is then supplied to a monitor. The port may be a serial port or a USB (Universal Serial Bus) port.

There is known a monitoring apparatus that monitors a processing device having a pointing function such as a mouse or keyboard, as described in Japanese Patent Application Publication No. 2006-99498, which is hereinafter referred to as Document 2. The monitoring apparatus has a quasi-mouse and a quasi-keyboard, applies a signal to the processing device to be monitored. The signal is a mouse or keyboard signal from the quasi-mouse or the quasi-keyboard. The monitoring apparatus determines whether there is a change in image information processed by the processing device or not. When there is no change in image information, the monitoring apparatus determines that a problem has occurred in the processing device.

In the KVM switch described in Document 1, when a problem occurs in the selected server and causes the server to freeze up, video data indicating freezing up is displayed on the monitor. Thus, a user is urged to switch on the server again in order to restart the server.

When the user who watches the monitor is at a distant place away from a place where the server is set, the user is required to ask an administrator to switch on the server again. However, this is bothersome.

It is now assumed that the KVM switch described in Document 1 is combined with the art described in Document 2, in which the monitoring apparatus transmits the predetermined signal to the monitored device for detecting a problem therein. In this case, it is necessary for the KVM switch to transmit the predetermined signal to the server for detecting a problem in the server. However, this increases the load of the KVM switch. Further, when the user who watches the monitor is at a distant place away from a place where the server is set, the user is required to ask the administrator to switch on the server again. However, this is bothersome.

SUMMARY OF THE INVENTION

The present invention has been made in view of the above-mentioned circumstances and aims to provide a KVM switch, a KVM system and a computer readable medium, which is capable to restore defects on an information processing device automatically.

According to a first aspect of the present invention, there is provided a KVM switch, which is connected to a power supply regulator that controls an information processing device and power supply thereto, including: a receiving part that receives screen data outputted from the information processing device; a storing part that stores partial data of a freeze-up screen outputted when the information processing device freezes up; a determining part that determines whether the received screen data includes a part identical to the partial data of the freeze-up screen; and a controlling part that controls the power supply regulator to restart the information processing device, when the determining part determines that the received screen data includes the part identical to the partial data of the freeze-up screen.

According to a second aspect of the present invention, there is provided a KVM system including a KVM switch, a power supply regulator, and a power control part, the KVM switch including: a receiving part that receives screen data outputted from an information processing device; a first storing part that stores partial data of a freeze-up screen outputted when the information processing device freezes up; a determining part that determines whether the received screen data includes a part identical to the partial data of the freeze-up screen; and a transmitting part that transmits a command for turning off power supply to the information processing device to the power supply regulator when the determining part determines that the received screen data includes the part identical to the partial data of the freeze-up screen, and transmits a command for turning on power to the information processing device to the power supply regulator after a predetermined time, the power supply regulator having: a power supplying part that supplies power to the information processing device; and a controlling part that controls the power supply part to stop power supply to the information processing device based on the command for turning off power to the information processing device; and controls the power supply part to activate power supply to the information processing device based on the command for turning on power to the information processing device.

According to a third aspect of the present invention, there is provided a computer readable medium, which stores a program that causes a KVM switch that is connected to a power supply regulator that controls an information processing device and a power supply thereto and is equipped with a storing part that stores partial data of a freeze-up screen outputted when the information processing device freezes up to function as: a receiving part that receives screen data outputted from the information processing device; a determining part that determines whether the received screen data includes a part identical to the partial data of the freeze-up screen; and a controlling part that controls a power supply regulator to restart the information processing device, when the determining part determines that the received screen data includes the part identical to the partial data of the freeze-up screen.

BRIEF DESCRIPTION OF THE DRAWINGS

FIG. 5 is a diagram showing an example of table data describing a relationship among servers, identification information thereof and connectors;

FIG. 6 is a flowchart showing a series of process activated by the KVM switch and the power supply regulator;

FIG. 7A shows an example of a freeze-up screen of WINDOWS (registered trademark), and FIG. 7B shows an example of a freeze-up screen of Macintosh (registered trademark); and FIG. 8 shows an example of a freeze-up screen of UNIX (registered trademark).

DESCRIPTION OF THE PREFERRED EMBODIMENTS

A description will now be given of the present invention with reference to the accompanying drawings.

Figure 1A:
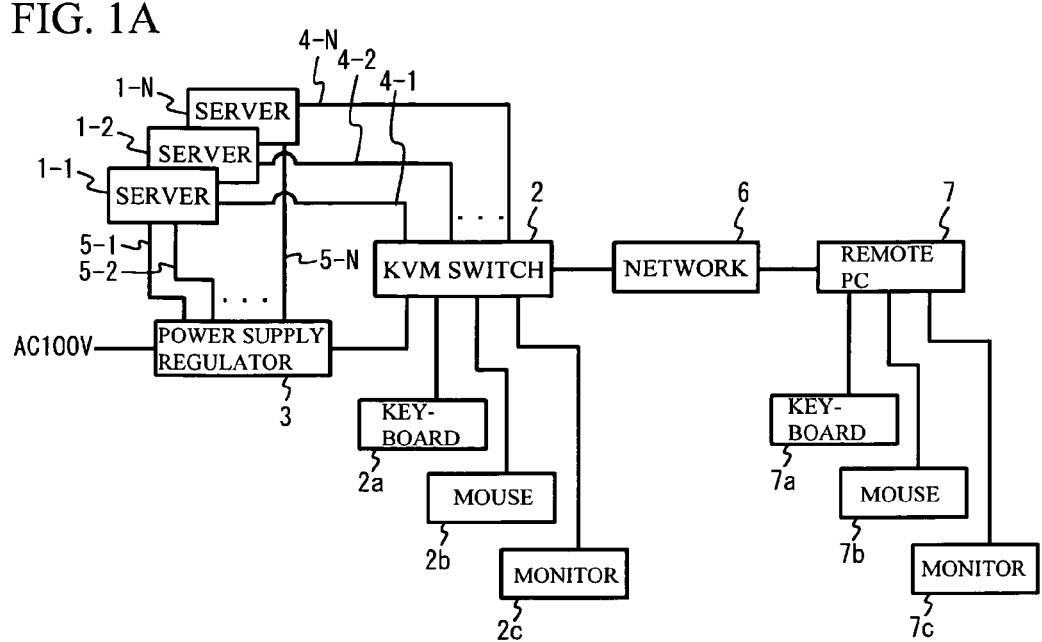
FIG. 1A is a configuration diagram of a system including a KVM switch in accordance with an embodiment of the present invention.
Figure 1B:
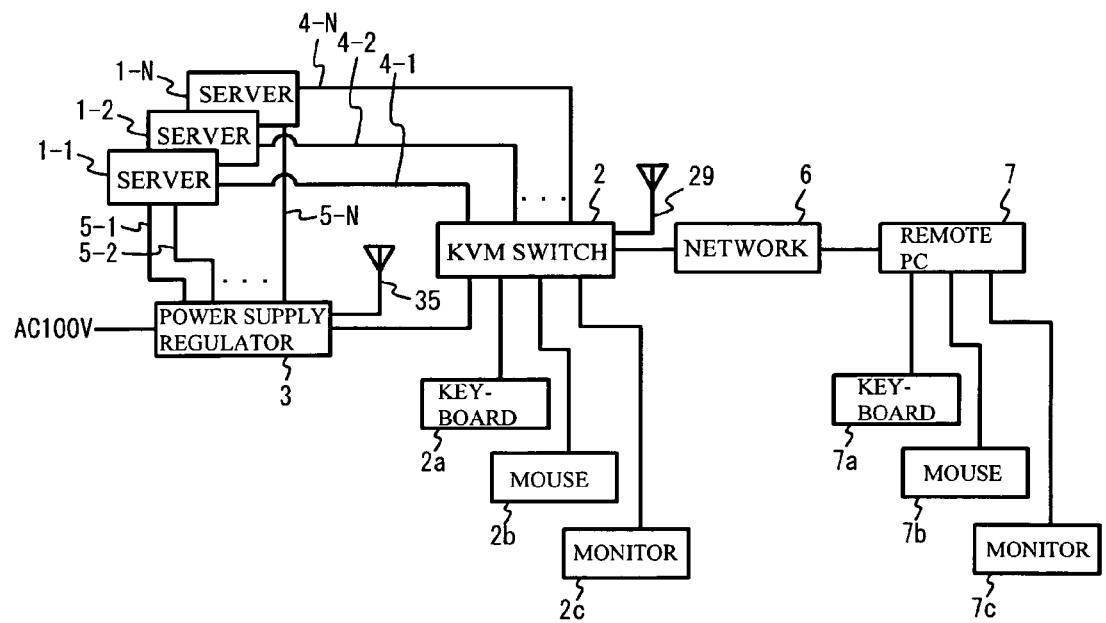
FIG. 1B is a configuration diagram of a variation of the system including the KVM switch in accordance with the embodiment of the present invention.

FIG. 1A is a configuration diagram of a system including a KVM switch in accordance with an embodiment of the present invention, and FIG. 1B is a configuration diagram of a variation of the system including the KVM switch.

The system in FIG. 1A includes a plurality of servers 1-1 through 1-N (N is an integral number equal to or greater than one), a KVM switch 2 (K: keyboard, V: video, M: mouse), a power supply regulator 3, and a remote PC 7. The KVM switch 2 is connected to a keyboard 2a, a mouse 2b and a monitor 2c, and the remote PC 7 is connected to a keyboard 7a, a mouse 7b and a monitor 7c. The remote PC is not limited to be single, but may be multiple.

The KVM switch 2 is connected to the remote PC 7 via a network 6. Further, the KVM switch 2 is connected to the servers 1-1 through 1-N via KVM cables 4-1 through 4-N. The KVM cables 4-1 through 4-N are used to transmit keyboard signals of the keyboard 2a or 7a and mouse signal of the mouse 2b or 7b to the target server that is subject to be operated and to transmit the video signal from the target server to the KVM switch 2. The KVM switch 2 is connected to the power supply regulator 3 via a communication cable 8.

The power supply regulator 3 is connected to a power of AC 100 V that is necessary to operate the servers 1-1 through 1-N, and is further connected to the servers 1-1 through 1-N via power cables 5-1 through 5-N.

The KVM switch 2 receives commands from the remote PC 7, the keyboard 2a or the mouse 2b, selects the target server subject to be operated from among the plurality of the servers 1-1 through 1-N, and switches the connection from the server in operation to the selected server. Further, the KVM switch 2 controls to turn on and off power that is supplied to each server from the power supply regulator 3.

In the system shown in FIG. 1B, the KVM switch 2 has an antenna 29, and the power supply regulator 3 has an antenna 35. The KVM switch 2 controls to turn on and off power that is supplied to each server from the power supply regulator 3 via the antennas 29 and 35. That is, the KVM switch 2 controls to turn on and off power that is supplied to each server from the power supply regulator 3 by radio communication. The other configurations of the system shown in FIG. 1B are the same with those of FIG. 1A.

Figure 2:
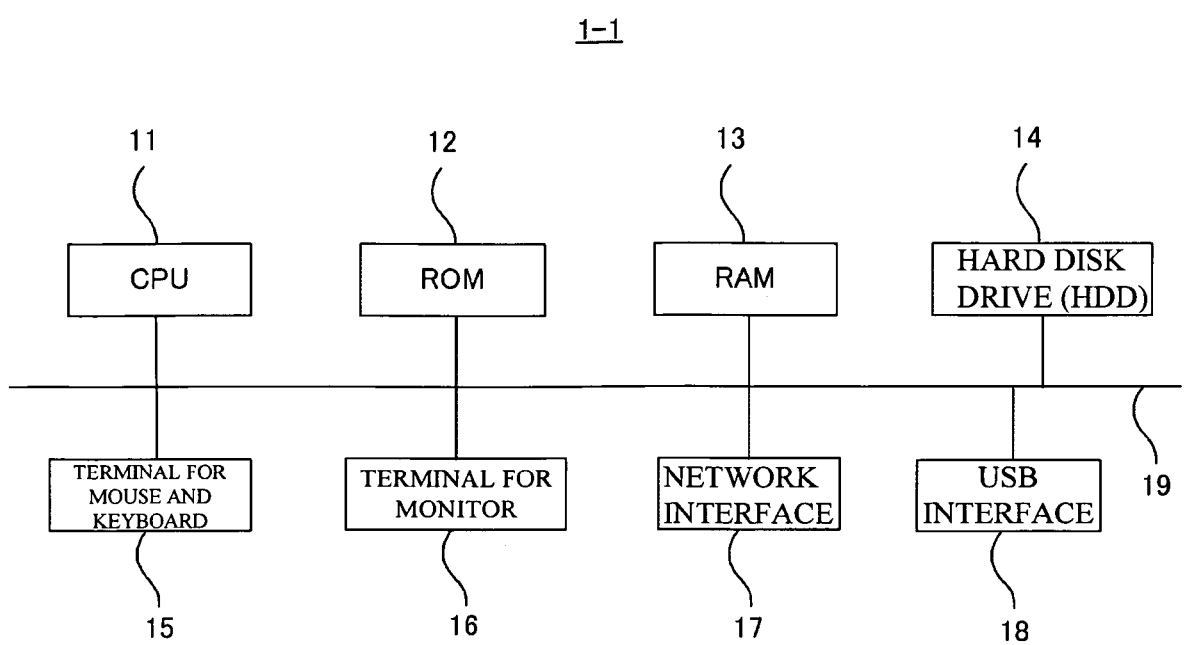
FIG. 2 is a block diagram of a hardware configuration of a server.

FIG. 2 is a block diagram of a hardware configuration of the server 1-1.

The server 1-1 has: a CPU 11 which controls the whole apparatus; a ROM 12 which stores a controlling program; a RAM 13 which is used as a working area; a hard disk drive (HDD) 14 which includes a variety of information and programs; terminals 15 for connecting a mouse and a keyboard; a terminal 16 for connecting a monitor; a network interface 17; and a USB (universal serial bus) interface 18 for connecting a USB device, which is not shown. The CPU 11 is connected to the ROM 12, the RAM 13, the hard disk drive (HDD) 14, the terminals 15 and 16, the network interface 17 and the USB interface 18 via a system bus 19.

The servers 1-2 through 1-N and the remote PC 7 may have the same configuration with the server 1-1.

Figure 3A:
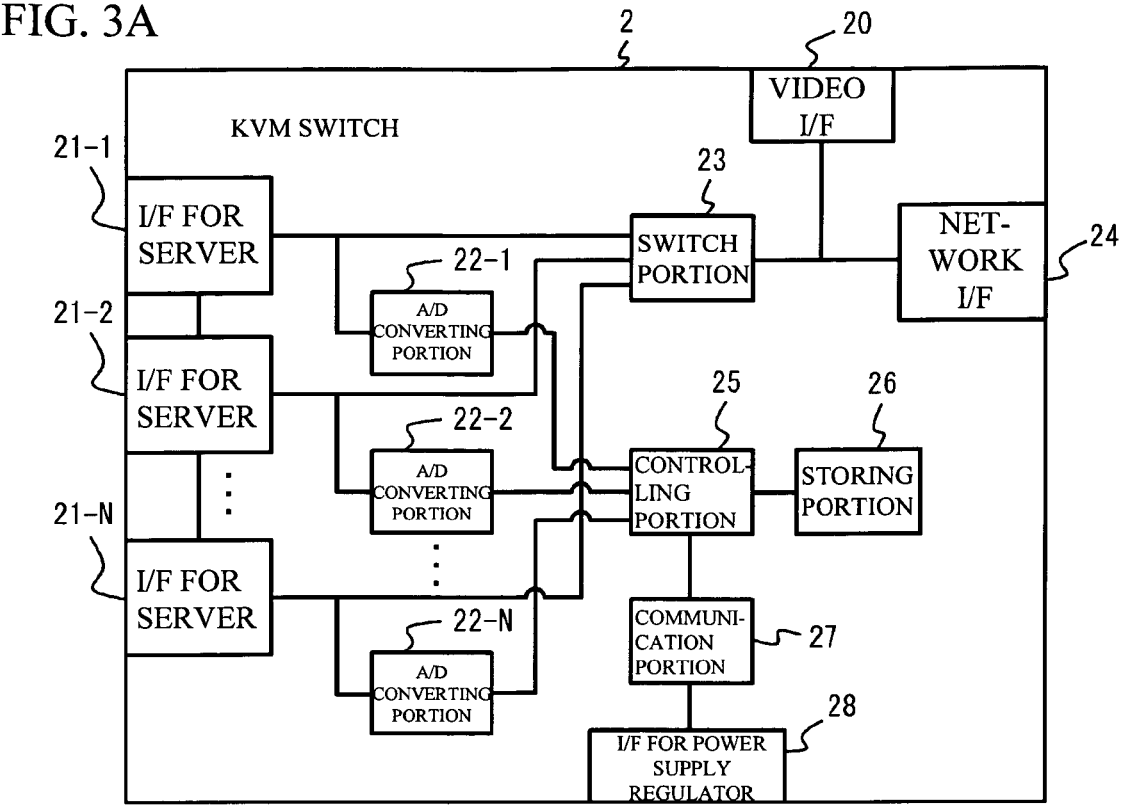
FIG. 3A is a block diagram of the KVM switch.
Figure 3B:
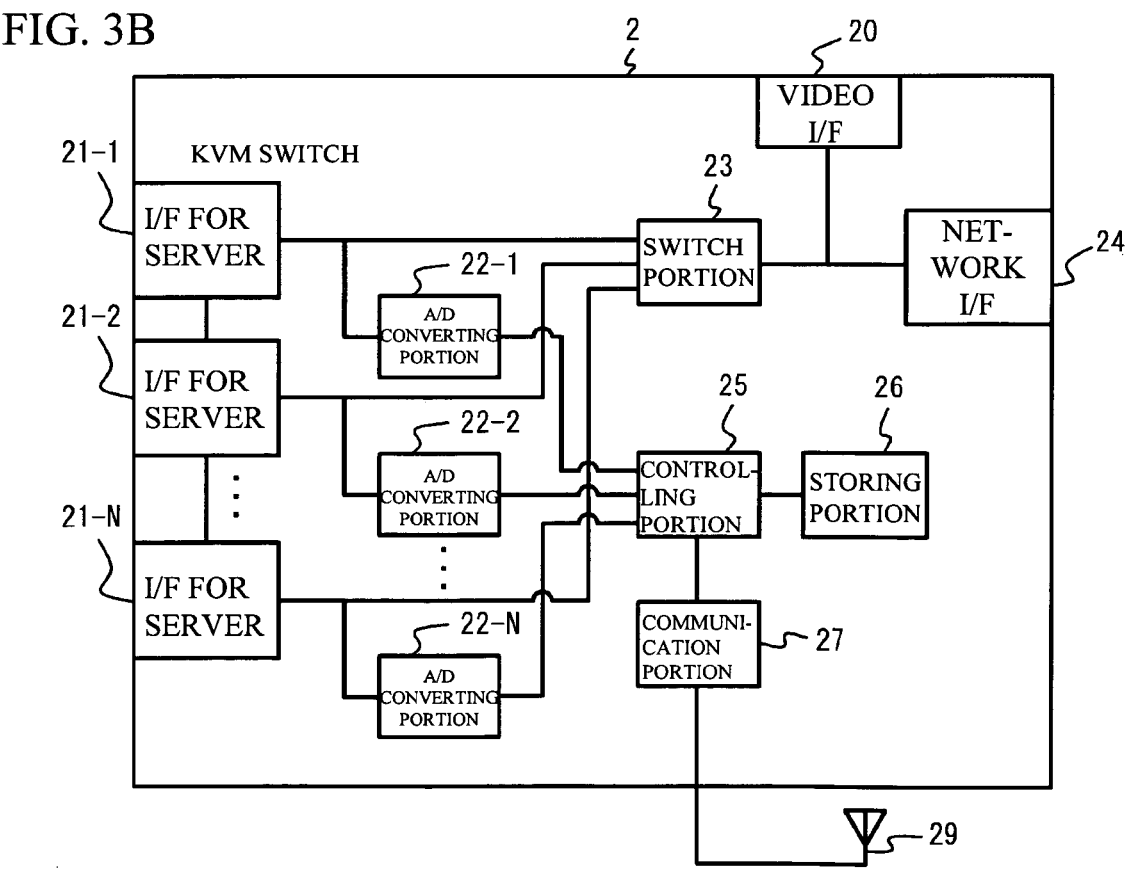
FIG. 3B is a block diagram of a variation of the KVM switch.

FIG. 3A is a block diagram of a configuration of the KVM switch 2, and FIG. 3B is a block diagram of a variation of the configuration of the KVM switch 2. These block diagrams only show configurations related to video signals for the sake of simplicity.

In FIG. 3A, the KVM switch is equipped with: a video interface (I/F) 20 for connecting to the monitor 2c; I/Fs 21-1 through 21-N (receiving part) for connecting to each of the plurality of servers 1-1 through 1-N; A/D converting portions 22-1 through 22-N (receiving part); a switch portion 23; a network I/F 24 for connecting to the network 6; a controlling portion 25 having a microcomputer (receiving part, determining part, controlling part and transmitting part); a storing portion 26 having a memory (a first storing part); a communication portion 27 (transmitting part); and an I/F 28 for connecting to the power supply regulator 3 (transmitting part). The I/Fs 21-1 through 21-N for the servers are connected to the switch portion 23 and to corresponding A/D converting portions 22-1 through 22-N, respectively. The A/D converting portions 22-1 through 22-N are connected to the controlling portion 25. The controlling portion 25 is connected to the storing portion 26 and the communication portion 27. The communication portion 27 is connected to the I/F 28 for the power supply regulator. The switch portion 23 is connected to the video I/F 20 and the network I/F 24.

The A/D converting portions 22-1 through 22-N convert analog video signals from the I/Fs 21-1 through 21-N for servers to digital data, respectively. The switch portion 23 selects one of the I/Fs that is connected to the target server to be operated from among the I/Fs 21-1 through 21-N, and switches the connection from the I/F in operation to the selected I/F.

The storing portion 26 stores partial data of the freeze-up screen of OS (operating system) of each server. Multiple operating systems may be operable in an information processing device.

The controlling portion 25 receives digital data from the A/D converting portions 22-1 through 22-N, and compares the received digital data with the partial data of each freeze-up screen stored in the storing portion 26. When the received digital data includes a part identical to the partial data, the controlling portion 25 transmits to the communication portion 27 a command to turn off power to the server in operation. The commands for respectively turning on and off power to the server include identification information for identifying the server.

The communication portion 27 receives the command to turn off power to the server in operation from the controlling portion 25, and transmits thereof to the power supply regulator 3 via the I/F 28 for the power supply regulator.

The KVM switch in FIG. 3B has the antenna 29 that is connected to the communication portion 27, instead of the I/F 28 for the power supply regulator. The other configurations of the KVM switch in FIG. 3B are the same with those of the KVM switch in FIG. 3A.

Figure 4A:
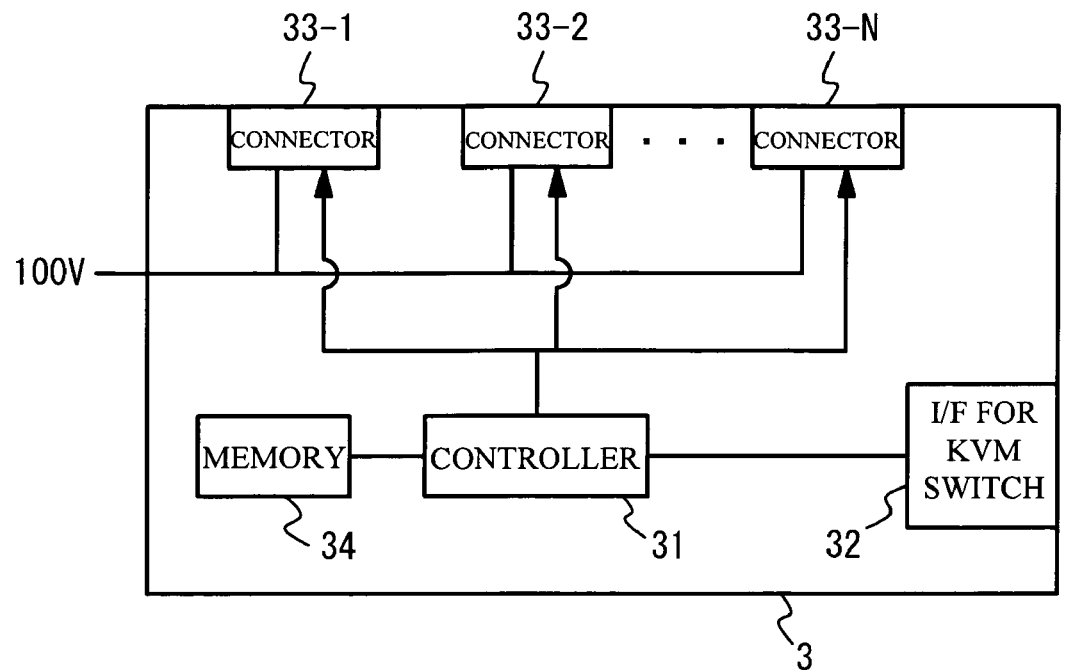
FIG. 4A is a block diagram of a power supply regulator.
Figure 4B:
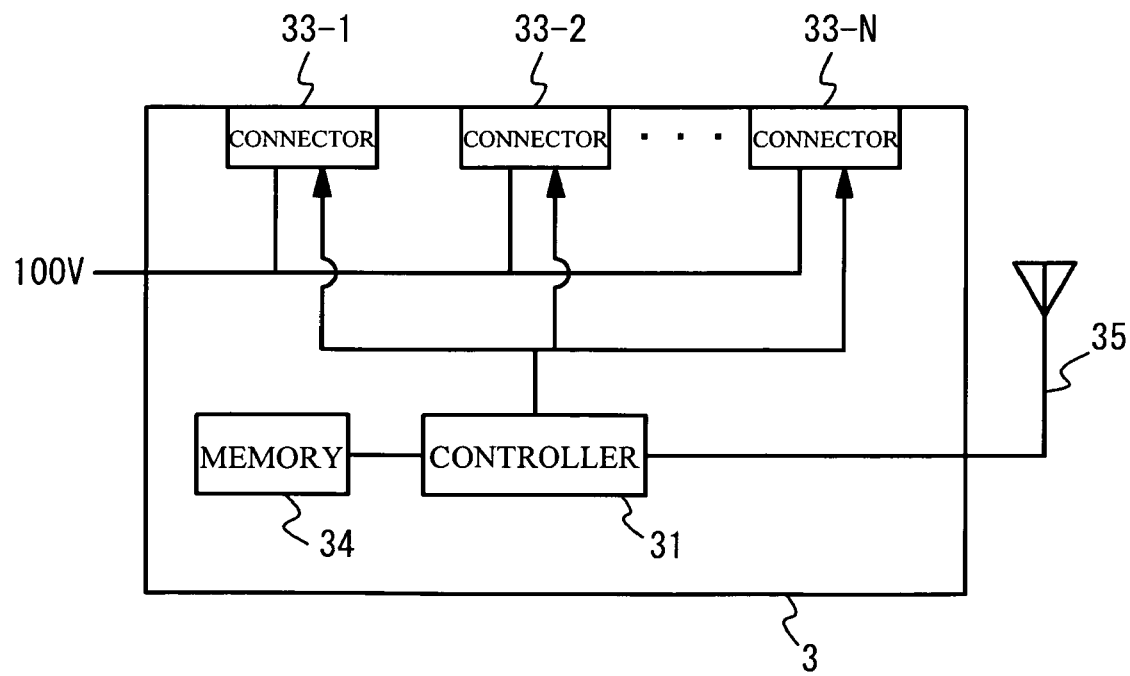
FIG. 4B is a block diagram of another configuration of the power supply regulator.

FIG. 4A is a block diagram showing a configuration of the power supply regulator 3, and FIG. 4B is a block diagram showing a variation of the configuration of the power supply regulator 3.

In FIG. 4A, the power supply regulator 3 is equipped with: a controller 31 (controlling part); an I/F 32 for KVM switch; connectors 33-1 through 33-N connecting to the power cables 5-1 through 5-N (power supplying part and power supplying portion); and a memory 34 (a second storing part).

The connectors 33-1 through 33-N are connected to a power of AC 100 V. The connectors 33-1 through 33-N start to supply power to the servers 1-1 through 1-N in response to a turn-on signal from the controller 31, and stop supplying power to the servers 1-1 through 1-N in response to a turn-off signal from the controller 31.

The memory 34 stores table data in FIG. 5, showing a relation among the server, identification information thereof and the connector.

When the controller 31 receives a command to turn off power to the server from the KVM switch 2, the controller 31 transmits the turn-off signal to the connector corresponding to identification information of the server included in the above-mentioned command on the basis of the table data in FIG. 5. Further, when the controller 31 receives a command to turn on the power to the server from the KVM switch 2, the controller 31 transmits the turn-on signal to the connector corresponding to identification information of the server included in the command on the basis of the table data in FIG. 5.

The power supply regulator 3 in FIG. 4B has the antenna 35, instead of the I/F 32 for KVM switch. In this case, the controller 31 receives commands from the KVM switch 2 via the antenna 35.

FIG. 6 is a flowchart of showing operations of the KVM switch 2 and the power supply regulator 3.

First, the controlling portion 25 of the KVM switch 2 receives digital data from the A/D converting portions 22-1 through 22-N (step S11), and reads out the partial data of the freeze-up screen of each server's OS from the storing portion 26 (step S12).

FIG. 7A shows an example of the freeze-up screen in WINDOWS (registered trademark), FIG. 7B shows an example of the freeze-up screen in Macintosh (registered trademark), and FIG. 8 shows an example of the freeze-up screen in UNIX (registered trademark).

The storing portion 26 stores screen data, which are surrounded by broken lines 51 and 52 as the partial data of the freeze-up screen in WINDOWS (registered trademark), which are surrounded by broken lines 53 through 56 as the partial data of the freeze-up screen in Macintosh (registered trademark), and which are surrounded by broken lines 57 as the partial data of the freeze-up screen in UNIX (registered trademark). A character string surrounded by the broken lines 56 is translated into English as shown in a character string surrounded by the broken lines 53, translated into French as shown in a character string surrounded by the broken lines 54, translated into Germany as shown in a character string surrounded by the broken lines 55.

Further, colors of the freeze-up screen are as follows: the character string is white and the background is navy blue in WINDOWS (registered trademark); the character string is black and the background is white in Macintosh (registered trademark); and the character string is white and the background is black in UNIX (registered trademark).

Turning back to FIG. 6, the controlling portion 25 determines whether each of pieces of digital data transmitted from the A/D converting portions 22-1 through 22-N includes the part identical to the partial data of the freeze-up screen read out from the storing portion 26, that is each screen data surrounded by the broken lines 51 through 57 (step S13).

If the answer is NO in step S13, the operation goes back to step S11. Meanwhile, if the answer is YES in step S13, the controlling portion 25 transmits a command to turn off power to the server, via the communication portion 27 to the power supply regulator 3 (step S14).

The controller 31 provided in the power supply regulator 3 receives the command to turn off power to the server and transmits a turn-off signal to the connector corresponding to identification information included in the above command, based on the table data in FIG. 5 (step S21). Thus, power to the server designated by the KVM switch 2 is once turned off.

The controlling portion 25 is in the standby mode for a predetermined time (for example, 10 seconds) (step S15), so that the power supply regulator 3 enables to once turn off power to the corresponding server completely.

After that, the controlling portion 25 transmits a command turning on power to the identical server via the communication portion 27 to the power supply regulator 3 (step S16), and the operation of the KVM switch 2 is terminated.

The controller 31 provided in the power supply regulator 3 receives the command turning on power to the server and transmits a turn-on signal to the connector corresponding to identification information included in the command, based on the table data in FIG. 5 (step S22), and the operation of the power supply regulator 3 is then terminated. Thus, the server designated by the KVM switch 2 turns on power again, and the server is enabled to restart. It is thus possible to restore the defect of the server automatically.

As explained above in detail, in accordance with the present embodiment, the storing portion 26 stores the partial data of the freeze-up screen that is outputted when each server freezes up. The controlling portion 25 receives the digital data (that is, the screen data) outputted from each server (step S11) and determines whether the received screen data includes the part identical to the partial data of the freeze-up screen (step S13). And the controlling portion 25 controls the power supply regulator 3 to restart the freeze-up server when it is determined that the received screen data includes the part identical to the partial data of the freeze-up screen (steps S14 through S16). Therefore, it is possible to restore the defect of the server automatically.

It is expected to have the same effect when a KVM switch 1 activates a program of software for realizing function of the KVM switch 1.

The present invention is not limited to the specifically disclosed embodiments, but other embodiments and variations may be made without departing from the scope of the present invention.

The present application is based on Japanese Patent Application No. 2007-244402 filed Sep. 20, 2007, the entire disclosure of which is hereby incorporated by reference.

What is claimed is:

1. A KVM switch, which is connected to a power supply regulator that controls an information processing device and power supply thereto, the KVM switch comprising:
   a receiving part that receives screen data outputted from the information processing device;
   a storing part that stores partial data of a freeze-up screen outputted when the information processing device freezes up;
   a determining part that determines whether the received screen data includes a part identical to the partial data of the freeze-up screen; and
   a controlling part that controls the power supply regulator to restart the information processing device, when the determining part determines that the received screen data includes the part identical to the partial data of the freeze-up screen.

2. The KVM switch as claimed in claim 1, wherein the controlling part supplies the power supply regulator with a command turning off power to the information processing device, when the received screen data is determined to include a part identical to the partial data of the freeze-up screen, and after a predetermined time, supplies the power supply regulator with another command turning on power to the information processing device.

3. The KVM switch as claimed in claim 2, wherein when multiple information processing devices are connected to the KVM switch, the commands respectively turning off and on power to the information processing devices include identification information that identifies each of the multiple information processing devices.

4. The KVM switch as claimed in claim 1, wherein the storing part includes multiple pieces of partial data respectively corresponding to freeze-up screens of multiple operating systems that are operable in the information processing device.

5. A KVM system comprising a KVM switch, a power supply regulator, and a power control part, the KVM switch including:
a receiving part that receives screen data outputted from an information processing device;
a first storing part that stores partial data of a freeze-up screen outputted when the information processing device freezes up;
a determining part that determines whether the received screen data includes a part identical to the partial data of the freeze-up screen; and
a transmitting part that transmits a command for turning off power supply to the information processing device to the power supply regulator when the determining part determines that the received screen data includes the part identical to the partial data of the freeze-up screen, and transmits a command for turning on power to the information processing device to the power supply regulator after a predetermined time, the power supply regulator having:
a power supplying part that supplies power to the information processing device; and
a controlling part that controls the power supply part to stop power supply to the information processing device based on the command for turning off power to the information processing device; and controls the power supply part to activate power supply to the information processing device based on the command for turning on power to the information processing device.

6. The KVM system as claimed in claim 5, wherein when the KVM system includes multiple information processing devices, the commands respectively turning off and on power to the information processing device include identification information that identifies each of the information processing devices, the power supply part includes multiple power supplying portions,
the power supply regulator includes a second storing part that stores table data which correlates the identification information with power supplying portions corresponding to said identification information, and
the controlling part stops power supplying portions corresponding to identification information included in the command for turning on power to the information processing device based on the table data, and activates power supplying portions corresponding to identification information included in the command for turning off power to the information processing device.

7. A computer readable medium, which stores a program that causes a KVM switch that is connected to a power supply regulator that controls an information processing device and a power supply thereto and is equipped with a storing part that stores partial data of a freeze-up screen outputted when the information processing device freezes up to function as:

a receiving part that receives screen data outputted from the information processing device;
a determining part that determines whether the received screen data includes a part identical to the partial data of the freeze-up screen; and
a controlling part that controls a power supply regulator to restart the information processing device, when the determining part determines that the received screen data includes the part identical to the partial data of the freeze-up screen.

* * * * *